United States Patent [19]

McGauley et al.

[11] 3,917,800
[45] Nov. 4, 1975

[54] METHOD FOR REMOVING OXIDES OF SULFUR FROM SULFUR BEARING GAS

[75] Inventors: Patrick John McGauley, Port Washington, N.Y.; Abraham A. Dor, Lakewood, Ohio

[73] Assignee: The Hanna Mining Company, Cleveland, Ohio

[22] Filed: Oct. 5, 1973

[21] Appl. No.: 403,951

[52] U.S. Cl. ............... 423/244; 423/530; 423/541; 423/569
[51] Int. Cl.² .................................... C01B 17/60
[58] Field of Search .......... 423/242, 244, 569, 570, 423/530, 541

[56] References Cited
UNITED STATES PATENTS

| | | | |
|---|---|---|---|
| 1,412,452 | 4/1922 | Coolbaugh | 423/244 |
| 1,771,136 | 7/1930 | Murphy | 423/244 |
| 2,148,258 | 2/1939 | Carter | 423/569 |
| 2,202,414 | 5/1940 | Barnes et al. | 423/153 |
| 2,889,207 | 6/1959 | Eliot | 423/574 |

FOREIGN PATENTS OR APPLICATIONS

| | | | |
|---|---|---|---|
| 1,043,304 | 11/1958 | Germany | 423/634 |
| 3,187 | 12/1857 | United Kingdom | 423/242 |
| 183 | 1/1873 | United Kingdom | 423/242 |
| 4,199 | 7/1818 | United Kingdom | 423/242 |
| 2,987 | 12/1858 | United Kingdom | 423/242 |

OTHER PUBLICATIONS

Abraham et al., "Magnetic Separation of Iron," Nature, June 13, 1925, p. 930, No. 2902, Vol. 115.

Primary Examiner—Oscar R. Vertiz
Assistant Examiner—Gary P. Straub
Attorney, Agent, or Firm—Donnelly, Maky, Renner & Otto

[57] ABSTRACT

Gases containing oxygen and sulfur are contacted with a solid sorbent material of ferrous sulfate, iron oxide, or combinations of both, to remove the sulfur from the gas by converting the sorbent to ferric sulfate. The ferric sulfate is decomposed at a low temperature to magnetite and sulfur dioxide in the presence of a reducing agent, and the magnetite is recycled for use as part or all of the solid sorbent in the process.

11 Claims, 4 Drawing Figures

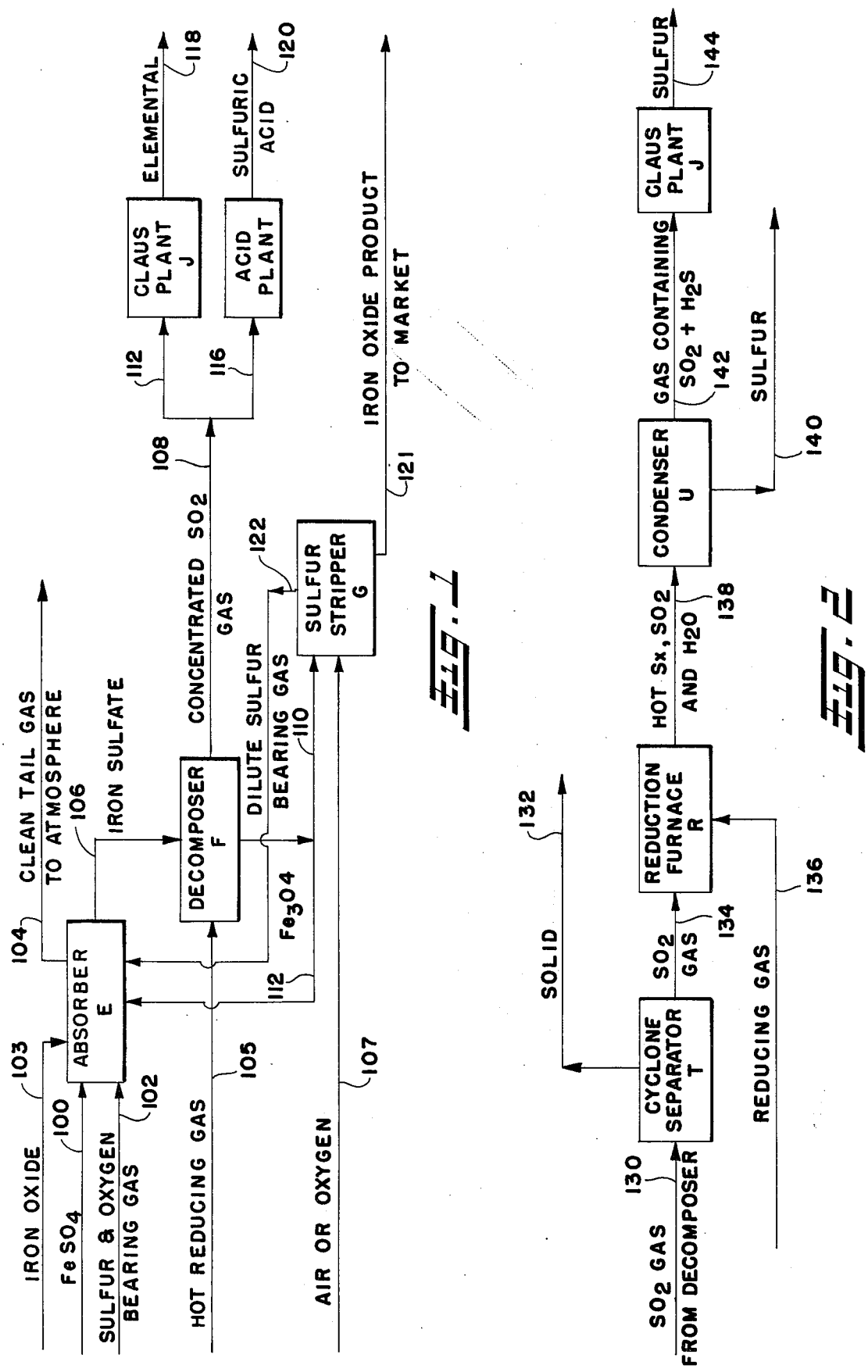

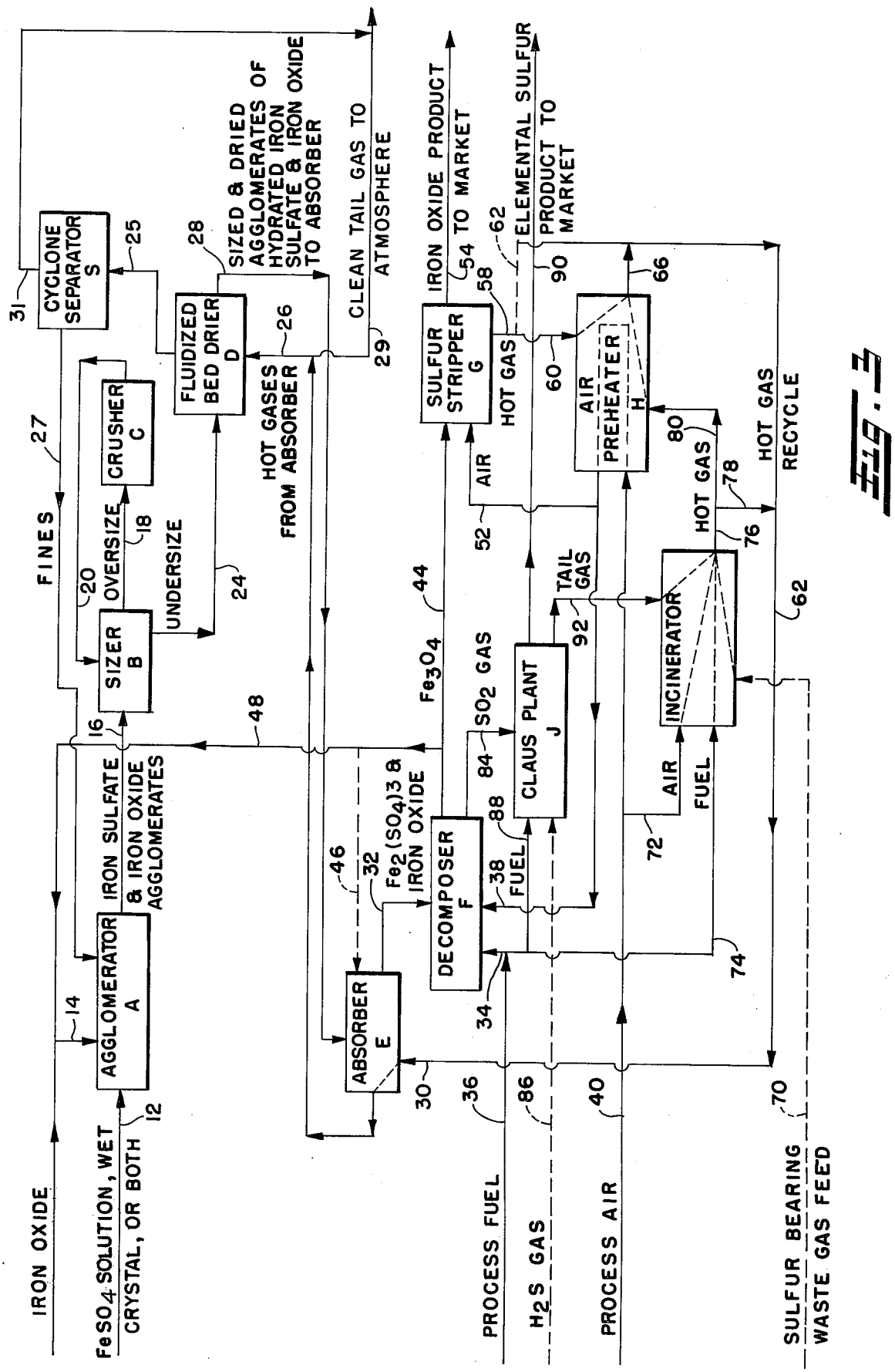

METHOD FOR REMOVING OXIDES OF SULFUR FROM SULFUR BEARING GAS

BACKGROUND OF THE INVENTION

This application pertains to the art of gas purification, and more particularly to removal of the oxides of sulfur from sulfur bearing gas. The application is particularly applicable to production of commercial quality elemental sulfur, sulfuric acid and iron oxide from industrial waste materials.

Many industrial operations produce iron sulfate, sulfur-bearing gases, or combinations of both, as waste materials. Such waste materials are commonly produced from mining and industrial operations involving the production of non-ferrous metals, coal, steel, titanium pigments, sulfuric acid, elemental sulfur, electric power and similar products. Discharge of these waste materials result in undesirable pollution of air and water.

U.S. Pat. No. 3,053,651 discloses a process for conversion of iron in sulfide minerals, mineral waste materials, or combinations of both, to a calcined product containing acid soluble iron. The calcined product may also be reacted with dilute solutions of industrial wastes containing sulfuric acid and impurities to obtain purified neutral solutions having a high content of iron sulfate.

It would be desirable to have the capability of obtaining commercial quality iron and sulfur products from industrial wastes bearing iron sulfate and sulfur dioxide.

Air pollution with sulfur dioxide is a major problem in the United States today. Sulfur dioxide is objectionable principally because above relatively low concentrations it is toxic to human beings and animals and is destructive to vegetation. Sulfur dioxide and its oxidation products, sulfur trioxide and sulfuric acid, are a major source of acidity in rain and fog which in turn can be very corrosive.

At the present time, the largest amount of industrial sulfur oxide emissions results from the combustion of certain types of coal and oil which contain appreciable amounts of sulfur. Waste gas streams containing sulfur dioxide similarly are produced by other industrial processes such as in the smelting of sulfur-bearing minerals, the refining of sulfur containing crude oils, the syntheses of sulfuric acid, the sulfonation of hydrocarbons, the production of coke, the production of sulfur in a Claus process, the production of paper by way of a woodpulping process, and similar industrial processes.

Furthermore, the discharge of these gas streams containing sulfur dioxide into the atmosphere constitutes a waste of a valuable material because the sulfur contained therein is an industrial commodity. Currently, tens of millions of tons of sulfur oxides are released into the atmosphere over populated regions of the United States each year. Thus, the recovery of some of this sulfur dioxide either as such or in another form could result in the accumulation of a supply of useful chemicals of definite value.

Many processes have been proposed for removal of sulfur dioxide from these gas streams. Most of the proposed removal procedures which have been suggested utilize liquid sorption in which the sulfur dioxide containing gases are intimately contacted with an aqueous sorbent which typically contains chemicals in solution or in slurry which will react with the sulfur dioxide and absorb the same into the liquid solution. Examples of such sorbents include the oxides, hydroxides and carbonates of ammonia, the alkali metals, and the alkaline earth metals.

One disadvantage of the wet sorption process is that the sorption of the sulfur dioxide must occur at a rather low temperature. This results in cooling of the gases which are ultimately discharged to the atmosphere. Such cool gases will remain near ground level thus causing pollution of the ambient air at ground level which may be as serious as that presented by the untreated flue gas.

Other methods have been suggested for removing sulfur oxides from flue gases. Attempts to desulfurize fuels prior to combustion have been costly and not always effective. For some fuels, such as coal, many processes investigated to date do not economically desulfurize fuel.

Additive processes have been suggested wherein materials having the ability to combine with sulfur oxides are added either to the fuel or to the combustion gases. Additives which have been employed include soda, limestone, magnesia and magnesite, but such additives generally are costly.

Dry adsorption also has been suggested. Sulfur dioxide can be adsorbed at low temperature by materials such as aluminum oxide, activated carbon, and silica gel. A disadvantage of such adsorption processes is that they also require relatively low temperatures and have similar drawbacks to those of the wet absorption process described above.

Solid acceptors which absorb sulfur oxides also have been reported. Examples of such acceptors include alkalized alumina which is converted to the aluminum sulfate and mixtures of alkali oxides and iron oxide which are also converted to the corresponding sulfates. One important advantage of these solid absorption processes is that they can be operated at elevated temperatures, and the gas which ultimately is discharged to the atmosphere is at an elevated temperature and is readily dissipated in the atmosphere. There continues to be a need, however, for solid acceptors which are regenerative and economically acceptable in commercial scale sorption processes.

SUMMARY OF THE DISCLOSURE

In accordance with the present invention, sulfur bearing gas and particularly gases containing both oxygen and sulfur are contacted by a solid sorbent material of ferrous sulfate, iron oxide, or combinations thereof. The gas contacts the sorbent in the presence of oxygen, and the oxides of sulfur are removed from the gas by converting the sorbent to ferric sulfate.

In one preferred arrangement, ferrous sulfate and iron oxide are simultaneously fed to an agglomerator where the ferrous sulfate and iron oxide are mixed or formed into agglomerates. The agglomerates are fed to a sizer. Oversized agglomerates and particles are fed to a mechanical crusher which recycles to the sizer. Undersized particles are fed to a fluidized bed drier, dried and sized. The dried sorbent agglomerates and particles of iron oxide, iron sulfate, or mixture thereof, are fed to an absorber. Oxygen and sulfur-bearing gas passes through the absorber and the sulfur and oxygen in the gas react with the sorbent to form ferric sulfate.

The spent sorbent is then fed to a unit which decomposes the ferric sulfate at low temperatures to form a concentrated sulfur dioxide gas and magnetite. The magnetite from the decomposition unit either is recycled to the absorber or fed to a sulfur stripper where it is contacted by air to drive off any remaining sulfur as sulfur dioxide. Iron oxide from the sulfur stripper is of commercial quality and may be marketed for production of steel. The sulfur dioxide gas from the decomposition unit may be converted into elemental sulfur or sulfuric acid of commercial quality.

It is an object of the present invention to provide an improved process for producing commercial quality sulfur-bearing products from iron sulfate-bearing industrial wastes.

It is an additional object of the present invention to provide an improved combined apparatus and process for removing oxides of sulfur from sulfur-bearing gas.

It is a further object of the present invention to provide an improved apparatus and process for using iron oxide for removal of the oxides of sulfur from sulfur-bearing gas.

It is another object of the present invention to provide an improved apparatus and process for using mixtures of iron oxide and iron sulfate for removal of the oxides of sulfur from sulfur-bearing gas.

BRIEF DESCRIPTION OF THE DRAWINGS

The invention may take form in certain parts and arrangements of parts, preferred embodiments of which will be described in detail in this specification and illustrated in the accompanying drawings which form a part thereof.

FIG. 1 is a flow diagram showing an operation of the process of the invention;

FIG. 2 is a flow diagram showing a more detailed modification of the operating arrangement for generating elemental sulfur from the sulfur dioxide gas from the decomposition of iron sulfate in accordance with the process of the invention;

FIG. 3 is a flow diagram showing one modification of the improved process of the present invention for producing high purity iron oxides and elemental sulfur.

DESCRIPTION OF PREFERRED EMBODIMENTS

Figure 4:
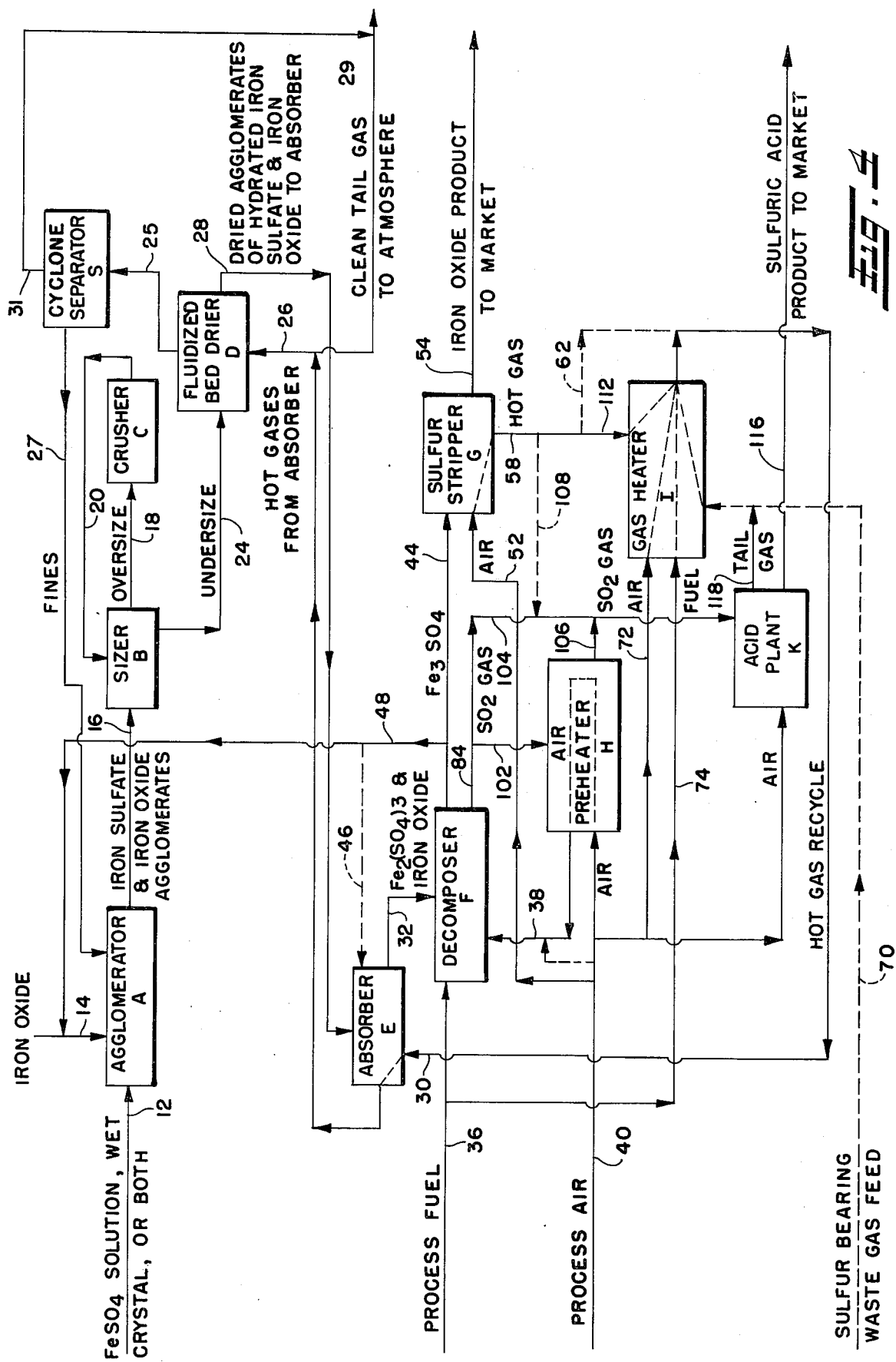
FIG. 4 is a flow diagram showing a modified operating arrangement of the improved process of the present invention for producing high purity iron oxides and sulfuric acid.

Referring now to the drawings, wherein the showings are for purposes of illustrating preferred embodiments of the invention only and not for purposes of limiting same, FIG. 1 illustrates the general arrangement of the process of the invention wherein both iron oxide and ferrous sulfate comprise the sorbent. The process also may be used with either of the sorbents used alone, especially, for example, when the iron sulfate is available in large quantities as an industrial waste material.

Solid iron sulfate is fed into absorber E as indicated by arrow 100. Iron oxide is fed into absorber E as either fresh iron oxide, as indicated by arrow 103, or recovered iron oxide from decomposer F, as indicated by arrow 112. The solids in absorber E are contacted with a sulfur and oxygen-bearing gas entering the absorber as indicated by arrow 102. The operating temperature of absorber E may be between 250° and 550°C. and is preferably between 325° and 450°C.

When ferrous sulfate and particularly hydrated ferrous sulfate is contacted by gas which bears sulfur and oxygen in the described range of temperatures, a reaction occurs between the components of the gas and the sorbent material to generate principally ferric sulfate. We assume that the theoretical basis for the absorption may proceed by a combination of steps which may include reactions such as the following:

1. $FeSO_4 \cdot XH_2O + Heat = FeSO_4 + XH_2O$
2. $2FeSO_4 \cdot XH_2O + O_2 + SO_2 = Fe_2(SO_4)_3 + 2XH_2O$
3. $2FeSO_4 + O_2 + SO_2 = Fe_2(SO_4)_3$
4. $4FeSO_4 + O_2 + 2SO_3 = 2Fe_2(SO_4)_3$ Alternatively, the ferrous sulfate may absorb the oxides of sulfur by the series of reactions outlined below as 5 and 6:

5. $6FeSO_4 + 3/2\ O_2 = 2Fe_2(SO_4)_3 + Fe_2O_3$
6. $Fe_2O_3 + 3SO_2 + 3/2\ O_2 = Fe_2(SO_4)_3$

The mechanism of sorption may be different to some extent from that postulated above since there is evidence (X-ray diffraction) that the final bed after absorption of $SO_2$ contains some $Fe_2S_2O_9 \cdot XH_2O$ and $FeSO_4$ in addition to the $Fe_2(SO_4)_3$. The X-ray diffraction does not indicate the presence of a significant amount of iron oxides.

The iron oxide sorbent is absorber unit E can react with sulfur and oxygen in the gas by reactions such as the following:

7. $2Fe_2O_3 + 3O_2 + 6SO_2 = 2Fe_2(SO_4)_3$
8. $2Fe_3O_4 + 5O_2 + 9SO_2 = 3Fe_2(SO_4)_3$
9. $2Fe_3O_4 + 4O_2 + 7SO_2 + 2SO_3 = 3Fe_2(SO_4)_3$

It has been found that the use of magnetite generated from iron sulfate as described below and particularly that generated at low temperatures and oxidized either simultaneously with or prior to being subjected to the sulfur and oxygen-bearing gas is highly effective in the absorber unit. On the basis of equal weights of iron oxide and iron sulfate, the capacity of such iron oxide to absorb oxides of sulfur from the hot sulfur-bearing gas is much higher than for iron sulfate. The absorber unit utilized in this invention may comprise one or more beds of the sorbent described above. The beds may be of the fixed, moving, fluidized or countercurrent type.

The sulfur and oxygen-bearing gases pass through absorber E and the sulfur and oxygen react with the iron oxides and ferrous sulfate to form principally ferric sulfate. The product gas from the absorber is essentially free of sulfur and is suitable for discharge into the atmosphere as a pollutionfree effluent as indicated by arrow 104.

The spent sorbent from absorber E is fed to decomposer F as indicated by arrow 106. The spent sorbent in decomposer F is contacted with hot reducing gases containing CO and $H_2$ fed into the decomposer as indicated by arrow 105. Because magnetite is the desired decomposition product, the temperature of the decomposition and concentration of the reducing gas utilized are interrelated as will be described below. The temperature of the decomposition may vary from between about 300° to about 700°C. although temperatures from about 400° to about 600°C. are preferred. Any equipment in which contact can be effected between a gas and a solid may be used for the decomposition. For example, fixed bed, moving bed and fluid bed techniques may be utilized. It has been observed that decomposition accomplished at lower temperatures results in a more active magnetite product.

The hot reducing gases utilized in the decomposition process normally contain both CO and $H_2$ as essential components, and normally are generated by the partial combustion of commercial fuels with air, and/or with preheated air. These gases normally are generated at high temperatures, and are used in the decomposition process at much lower temperatures. They normally provide both heat and chemical reagents for use in the reactions of the decomposition process. Moreover, they normally are generated in separate equipment attached to the decomposition reactor, but when certain types of commercial fuel are available for use in the process, the gas generation may be accomplished in the decomposition reactor.

The hot reducing gases utilized in the process of the invention may be generated by partial combustion of commercial fuel with air in chemical reactions such as the following exothermic reactions:

10. $CH_4 + 2O_2 = CO_2 + 2H_2O$
11. $CH_4 + O_2 = CO + H_2O + H_2$
12. $2C + O_2 = 2CO$
13. $CO + H_2O = CO_2 + H_2$

In the low temperature decomposition process of this invention, the hot gas product from the above gasification reactions is processed in contact with iron sulfate-bearing solids in decomposer F. The gas is utilized both as a source of reducing agent and a source of heat for the decomposition process. Moreover, the composition and temperature of the gas in the reaction zone of the process determines the composition and many of the properties of both the gas and solid products from the process. For example, the sulfur sorbent property of the iron oxide obtained by the low temperature decomposition process of the invention is significantly improved.

When the product gases from the reaction zone of the decomposition process are held between limits of composition and temperature that generate magnetite as a major component of the iron-bearing product, the decomposition reactions can be carried out both at temperatures and with ratios of fuel and air that are unusually low. This results in the generation of a product gas which is more concentrated in sulfur dioxide. The concentration of reducing agents in the feed gases utilized should be such that the product gas is in equilibrium composition with the magnetite at these temperatures.

The magnetite-bearing product obtained by the abovedescribed low temperature decomposition reaction is assumed to be produced by reactions such as the following:

14. $3FeSO_4 + 2H_2 = Fe_3O_4 + 2H_2O + 3SO_2$
15. $3FeSO_4 + 2CO = Fe_3O_4 + 2CO_2 + 3SO_2$
16. $3Fe(SO_4)_3 + 10H_2 = 2Fe_3O_4 + 10H_2O + 9SO_2$
17. $3Fe_2(SO_4)_3 + 10CO = 2Fe_3O_4 + 10CO_2 + 9SO_2$
18. $3Fe_2O_3 + H_2 = 2Fe_3O_4 + H_2O$
19. $3Fe_2O_3 + CO = 2Fe_3O_4 + CO_2$

The magnetite obtained by decomposition of the sulfates in decomposer F can be recycled to absorber E as indicated by arrow 112 or advanced to sulfur stripper G as indicated by arrow 110. Air or oxygen is supplied to sulfur stripper G in controlled quantities as indicated by arrow 107, and the magnetite is oxidized to provide heat for removal of any sulfur present by reactions such as the following:

20. $4Fe_3O_4 + O_2 = 6Fe_2O_3 + Heat$
21. $Fe_2(SO_4)_3 + Heat = Fe_2O_3 + 3SO_3$
22. $2Fe_3O_4 + SO_3 = 3Fe_2O_3 + SO_2$ High purity commercial quality iron oxide is withdrawn from sulfur stripper G as indicated by arrow 121. The removal of the objectionable sulfur generally does not require complete conversion of the magnetite to hematite, and the purified product generally will contain both magnetite and hematite.

A hot sulfur-bearing gas is discharged from sulfur stripper G and may be recycled to absorber E as indicated by arrow 122.

The sulfur dioxide containing gas produced in decomposer F is discharged therefrom as indicated by line 108 and fed as indicated by line 114 to a Claus plant or as indicated by line 116 to an acid plant. In Claus plant A, the sulfur dioxide can be contacted with reducing agents and the hydrogen sulfide-bearing product gas contacted with a catalyst to produce water and elemental sulfur. The elemental sulfur is discharged from the Claus plant as indicated by line 118. The elemental sulfur produced in the Claus plant is of commercial quality. The sulfuric acid is removed from acid plant as indicated by line 120.

As mentioned previously, the product gas exiting from decomposer F contains sulfur dioxide in high concentrations and reducing agents in low concentrations. In order to effectively utilize this gas mixture in a sulfuric acid plant, the product gas from decomposer F is reacted with air in quantities that will both oxidize the reducing agents present and provide excess oxygen. This oxygen-bearing product gas is utilized as the feed gas in the acid plant.

The magnetite obtained by the decomposition of the sulfates in decomposer F and recycled to absorber E can be made more active toward the oxides of sulfur by subjecting the magnetite to a low temperature oxidation treatment (not shown in FIG. 1). When the magnetite is oxidized at a temperature below about 450°C., it is converted to a product (principally hematite) which is highly reactive towards absorption of the oxides of sulfur. It is not known precisely why this low temperature pre-oxidation produces a more reactive iron oxide. At higher oxidation temperatures, the effectiveness of the product as a sorbent is minimized.

The oxidation of the magnetite-bearing solids can also occur in absorber E since the gas entering the absorber contains oxygen as well as sulfur. The magnetite-bearing solid obtained from the decomposition zone is advanced directly to the absorber as indicated by line 112 where it is contacted with a gaseous mixture containing sulfur and oxygen. The oxygen converts the magnetite to an active hematite sorbent which then reacts with $SO_2$ in the gas.

An improved process for the generation of elemental sulfur from the hot sulfur dioxide-bearing product gas exiting from decomposer F is illustrated in FIG. 2. The $SO_2$ gas from decomposer F is advanced to cyclone separator T as indicated by arrow 130. Entrained solids are removed from the hot gas in the cyclone separator and withdrawn as indicated by arrow 132. The sulfur dioxide gas after removal of the entrained solids in cyclone separator T is advanced to reduction furnace R as indicated by arrow 134. Reducing gases are fed into reducing furnace R as indicated by arrow 136. This reducing gas can be of the same composition as the reducing gas utilized in decomposer F of the process illustrated in FIG. 1. The reducing gases react with the cleaned $SO_2$ gas from the cyclone separator T to generate a hot product gas that contains elemental sulfur, hydrogen sulfide, sulfur dioxide, and other compounds which can involve chemical reactions such as the following:

23. $CH_4 + 2SO_2 = 2S_x{}^* + CO_2 + 2H_2O$
24. $CH_4 + SO_2 = H_2S + CO_2 + H_2$
25. $CH_4 + SO_2 = COS + H_2O + H_2$

26. $C_2H_6 + 2SO_2 = 2H_2S + 2CO_2 + H_2$
27. $3H_2 + SO_2 = H_2S + 2H_2O$
28. $2H_2 + SO_2 = S_x + 2H_2O$
29. $3CO + SO_2 = COS = 2CO_2$
30. $2CO + SO_2 = S_x + 2CO_2$
31. $2H_2S + SO_2 = 3S_x + 2H_2O$
32. $2COS + SO_2 = 3S_x + 2CO_2$
33. $COS + H_2O = H_2S + CO_2$
34. $CO + H_2O = H_2 + CO_2$

\* Where $S_x = S_1$ on the basis of stoichiometry, but the actual sulfur may be present in the product gas in the form of $S_2$, $S_4$, $S_6$, etc.

The reducing gases used in reduction furnace R generally will contain CO and/or $H_2$, and generally will be obtained from the partial combustion of commercial fuels with air. We have found, however, that raw hydrocarbon reducing agents, such as methane, ethane, etc., can be utilized in the reduction as illustrated above in equations 23–26 when the temperature of the reaction zone in the reduction furnace is higher than about 1100°C. Up to about 40 percent or more of the sulfur content of the sulfur dioxide product gas from the decomposer can be converted to elemental sulfur in reduction furnace R. This elemental sulfur is recovered as liquid sulfur by advancing the product gas from reduction furnace R to condenser U as indicated by arrow 138 and cooling the product gas therein to temperatures below the dew point of the sulfur. Liquid sulfur is recovered from condenser U as indicated by arrow 140.

The amount of reducing gas supplied to reduction furnace R is adjusted to provide a reducing agent concentration equal in quantity to that required by the stoichiometry of the reactions. When this control is maintained, the cooled gas exiting from the condenser U will contain $H_2S$ and $SO_2$ in the ratio of 2:1. This ratio is desirable since it is the ratio required to recover the remaining sulfur by the catalytic reactions of the conventional Claus process as indicated by equation 31 above. This cooled gas from condenser U is fed to a conventional Claus plant J as indicated by arrow 142 where the usual catalytic reactions can be effected to produce additional sulfur as indicated by arrow 144.

The remaining small quantities of entrained solids are carried through the process and are in the product gas from condenser U. Because any entrained solids will be entrapped in the interstices of the catalyst and this obstructs the further passage of the gas, they must be removed from the gas stream. We have found that partially cooling and scrubbing the product gas, and condensing the sulfur vapor in contact with liquid sulfur in equipment such as Venturi scrubbers (not shown in FIG. 2), will remove the remaining solids and enable operation of the Claus plant in the conventional manner. Solids such as silicates and sulfates which may be present in the liquid sulfur product can be removed by contacting the liquid sulfur with super-heated water which effects an extraction of the solids from the sulfur into the water phase. Alternatively, filtration of liquid sulfur can be utilized to remove any solids present.

FIG. 3 shows another arrangement of an improved process of the present invention for producing commercial quality iron oxides and elemental sulfur. Like parts have been given the same numerals and letters as those in FIG. 1. This example illustrates the process wherein both iron oxide and ferrous sulfate comprise the sorbent but the process also may be used with either of the sorbents used alone.

The embodiment in FIG. 3 includes the use of optional and generally preferred agglomerator and sizing units although these are not essential elements of the process of this invention.

The agglomerating and sizing units illustrated in FIG. 3 result in the formation of iron-bearing solids that are suitable in both particle size and mechanical properties for contacting with the gases containing the oxides of sulfur in fixed bed, fluid bed and/or transport reactors. In processes that involve the contacting of solids with gases, finely divided solids such as those smaller than 10 microns are difficult to separate from the gases. Moreover, finely divided solids that contain sulfate compounds are known to agglomerate into lumps of unmanageable size and/or to accumulate on the walls of the equipment under certain process conditions. Because these accumulations frequently interfere with the mechanical performance of the equipment, the process of this invention provides for separation of the finely divided solids and for the production of sized and classified solids that are essentially free of troublesome particles of both oversize and undersize solids.

Ferrous sulfate, in the form of a dry solid, solution, slurry or wet crystals, or combinations of these, is fed to an agglomerator A as indicated by arrow 12. Agglomerator A may be any of the well-known type of mixers wherein wet and dry materials are agglomerated during mixing. Dry iron oxide is also fed to agglomerator A as indicated by arrow 14 or by arrow 48 when the iron oxide is recycled from decomposer F. Obviously, the quantities of sulfate and dry iron oxide are proportioned in order that agglomeration will occur. Water and/or sulfuric acid may be added.

Agglomerates of iron sulfate and iron oxide are discharged from agglomerator A to sizer B as indicated by arrow 16. Sizer B may be any of the known mechanical sizing systems containing equipment such as screens, pneumatic sizers, etc. Oversized agglomerates are fed to a mechanical crusher C as indicated by arrow 18. Oversize agglomerates are reduced in size to maximum size particles generally that are between 4 and 40 mesh and preferably between about 10 and 20 mesh and recycled as indicated by arrow 20 to sizer B. Undersized particles are fed as indicated by arrow 24 to a fluidized bed drier D.

Hot gases essentially free of sulfur are fed to drier D as indicated by arrow 26. Although FIG. 3 shows the hot gases originating in absorber E and/or cyclone separator S, the hot gases obviously can be derived from other sources not shown. The fluid bed drier is operated at a temperature between 80° and 250°C., and preferably between 120° and 180°C. The hot gases pass through drier D, contact the iron sulfate and iron oxide, and evaporate water to a stoichiometric ratio of water-to-iron sulfate in the product that is between 0.1 and 4.5, and preferably between 0.3 and 3.0. This dried product of desired particle size is fed as indicated by arrow 28 to absorber E.

The flow rate of the hot gases through the fluid bed drier D is regulated to remove essentially all of the finely divided solids which are carried into the drier from the sizer. The solid fines such as those less than 10 microns are separated from the gas exiting from the drier as indicated by arrow 25 in cyclone separator S, and the fines are recycled to the agglomerator as indicated by arrow 27. After removal of the fines from the gas in separator S, the clean gas is discharged to the atmosphere as indicated by arrow 31.

The agglomerated particles of hydrated iron sulfate and iron oxide are contacted in absorber E by a high temperature gas entering absorber E as indicated by arrow 30. The high temperature gas entering absorber E contains oxygen and sulfur. The operating temperature of absorber E may be between 250° and 550°C., and preferably between 325° and 450°C. The hot gases entering absorber E are waste gases fed into incinerator I as indicated by arrow 70.

The spent sorbent from absorber E is fed to decomposer F as indicated by arrow 32 where it is contacted with hot reducing gases. In FIG. 3, the reducing gas is generated in situ by a partial combustion of process fuel and air fed into decomposer F as indicated by arrows 34 and 38, respectively. The process air passes through air preheater H as indicated by arrow 40. The reactions between a process fuel and the process air generating the hot reducing gas utilized in decomposer F have been described above as reactions 10–13.

The magnetite from decomposer F can be recycled either to absorber E as indicated by arrow 46, to agglomerator A as indicated by arrow 48, and/or fed to the sulfur stripper G as indicated by arrow 44. The magnetite which is recycled to absorber E can be oxidized at a low temperature prior to being fed to absorber E although this embodiment is not shown in FIG. 3.

Sulfur stripper G is supplied with air as indicated by arrow 52. This air is supplied in controlled quantities and the magnetite is oxidized to provide heat for removal of sulfur by reactions in the sulfur stripper such as described with respect to the embodiment of FIG. 1. High purity commercial quality iron oxide, principally a mixture of magnetite and hematite, is withdrawn from sulfur stripper G as indicated by arrow 54.

A hot sulfur-bearing gas is discharged from sulfur stripper G as indicated by line 58 which can be recycled to absorbor E directly as indicated by arrow 62 or the gas discharged from sulfur stripper G can be passed through air preheater H as indicated by arrow 60 and then recycled to absorber E as indicated by arrows 66 and 62. The hot sulfur-bearing gas fed to air preheater H as indicated by arrow 60 is used to heat combustion air flowing to air preheater H as indicated by arrow 40. The hot sulfur-bearing gas is not mixed with the combustion air but is simply used to transfer heat to the decomposition reactions.

Sulfur-bearing waste gas from an industrial operation is fed to incinerator I as indicated by line 70. This sulfur-bearing waste gas can be mixed and fired with the air and fuel entering incinerator I as indicated by arrows 72 and 74, respectively. The amount of air and fuel supplied to incinerator I is adjusted depending upon the temperature of the sulfer-bearing waste gases entering through line 70, and depending upon the desired temperature of the feed gas to absorber E. Sulfur-bearing hot gases are discharged from incinerator I as indicated by line 76. Some or all of these gases may be discharged as indicated by arrow 78 into line 62 for feeding directly to absorber E. Some or all of these hot gases may also be fed as indicated by line 80 into air preheater H for use in preheating combustion air. These sulfur-bearing gases are also discharged from air preheater H as indicated by arrow 66. Air heated within air preheater H is fed to decomposition device F as indicated by arrow 38. The line represented by numeral 38 may also be connected directly with process air line 40, but in this instance cold air and additional fuel will be used in the decomposition reactions.

Sulfur dioxide gas produced in decomposition unit F is discharged therefrom as indicated by arrow 84 to a Claus plant J. When it is available, hydrogen sulfide gas may be fed to the Claus plant J as indicated by line 86. Hydrogen sulfide and sulfur dioxide when contacted with the catalyst of the Claus plant will react to produce water and elemental sulfur.

The elemental sulfur produced within Claus plant J is discharged as indicated by line 90. The elemental sulfur is of commercial quality. Tail gas from Claus plant J is discharged as indicated by arrow 92 and fed to incinerator I where it is fired with air and fuel.

The arrangement of FIG. 4 is for the production of sulfuric acid rather than elemental sulfur. Like parts have been given like numerals and letters as in FIG. 3. In the arrangement of FIG. 4, instead of feeding sulfur dioxide gas from decomposer F to a Claus plant, all or a portion of such gas is fed as indicated by arrow 102 to air preheater H. Alternatively, all or a portion of the sulfur dioxide gas may be fed directly as indicated by arrow 104 to an acid plant K. In this instance, however, gas will be cooled and cleaned in the acid plant. Sulfur dioxide gas used in air preheater H to heat process air going to decomposer F is simply discharged to the acid plant K as indicated by arrow 106. Instead of feeding hot sulfur-bearing gas from sulfur stripper G to air preheater H as in FIG. 3, the arrangement of FIG. 4 provides for feeding of such hot sulfur-bearing gas to gas heater I. All or portion of the sulfur-bearing gas from sulfur stripper G as required for acid production may be fed as indicated by line 108 over to line 104 to acid plant K. All or the remaining portion of the sulfur-bearing gas from the sulfur stripper G may be fed through line 62 to absorber E. Alternatively, all or any desired fraction of the sulfur-bearing gas from sulfur stripper G may be directed through the gas heater as indicated by arrow 112.

The sulfur dioxide fed to acid plant K will be cleaned and converted into sulfuric acid by a conventional process. Prior to conversion to sulfuric acid, however, the hot sulfur dioxide-bearing gases must be treated to remove any reducing gases therein. Air in excess of that required to oxidize all of the remaining combustible material in the product gases from decomposer F is mixed with said product gases and reacted to form a hot product gas that contains both sulfur dioxide and oxygen. This hot gas is then subjected to a further cleaning operation in conventional equipment such as a cyclone separator, cooled and converted to sulfuric acid in acid plant K. A sulfur-bearing tail gas is recovered from acid plant K as shown by arrow 118. This tail gas is recycled to absorber E as indicated by arrow 30. The sulfuric acid product from acid plant K is recovered as a commercial product as indicated by arrow 116.

It will be recognized that the iron oxide used in the process may be obtained from the process of the invention by the conversion of ferric sulfate to iron oxide and sulfur dioxide gas, and this iron oxide is more absorbent. In addition, it will be recognized that iron oxide of sufficient purity is produced to enable sale of commercial quality iron oxide for use in manufacturing steel or the like. In addition, the improved process of the present invention removes the troublesome fraction of the sulfur from sulfur-bearing gas to provide an effluent of acceptable quality.

When the feed material to the process of the invention is ferrous sulfate from industrial wastes, both the sulfur content from the waste gases and the sulfur and iron content of the ferrous sulfate will be recovered by the process as products of commercial quality. The sulfur can be recovered as either elemental sulfur or sulfuric acid, and the iron is recovered as iron oxide. Rather than recycle the iron oxide obtained, it is sold as a useful product of the process and additional waste ferrous sulfate is fed to the process. The invention, therefore, provides a useful method for disposing of waste ferrous sulfate.

Although the invention has been shown and described with respect to certain preferred embodiments, equivalent alterations and modifications will occur to others skilled in the art upon the reading and understanding of this specification. The present invention includes all such equivalent alterations and modifications, and is limited only by the scope of the claims.

The above descriptions have illustrated the process of the invention with regard to the extraction of sulfur from a gas containing sulfur and oxygen. As mentioned previously, the procedure can be utilized for removing the oxides of sulfur from waste gas streams and various industrial processes such as the smelting of sulfur-bearing minerals, the refining of sulfur containing crude oils, and from stack gases of industrial plants such as power generating stations. In those instances where the waste gases contain a solid waste material such as fly ash, the gas may be subjected to a preliminary treatment to remove such solid materials.

The embodiments of the invention in which an exclusive property or privilege is claimed are defined as follows:

1. A continuous process for removing sulfur oxides from gases containing oxygen and sulfur oxides comprising the steps of:
   a. providing a solid sorbent material selected from the class consisting of ferrous sulfate, iron oxide and mixtures thereof,
   b. advancing at least a portion of said absorbing solids to an absorption zone,
   c. contacting the sulfur oxide-containing gas in the absorption zone with the sorbent at a temperature between 250° and 550°C.,
   d. reacting the sulfur oxides in the gas with the solid sorbent to form ferric sulfate and to produce a gas reduced in sulfur oxide content that can be discharged to the atmosphere,
   e. discharging the gas reduced in sulfur oxide content to the atmosphere,
   f. withdrawing a portion of the ferric sulfate-bearing solids after contact with the sulfur oxide-bearing gas,
   g. contacting said ferric sulfate-bearing solids in the said withdrawn solids with a hot reducing gas at a temperature of from about 300° to about 700°C. to produce magnetite in the decomposition product and a product gas that contains sulfur dioxide,
   h. recovering the sulfur dioxide-bearing gas and the magnetite-bearing product, and
   i. recycling at least a portion of the magnetite-bearing product as the solid iron oxide sorbent in step (a).

2. The process of claim 1 wherein the recovered magnetite-bearing product is oxidized at a temperature below about 450°C. prior to recycling to the absorption zone.

3. The process of claim 1 wherein the sulfur oxide bearing gas from the decomposition of the iron sulfates is reacted with additional reducing gas to produce elemental sulfur.

4. The process of claim 1 wherein the sulfur dioxide recovered from the decomposition of ferric sulfate is converted to sulfuric acid.

5. The process of claim 1 wherein the sorbent material supplied to the absorption zone is a mixture of ferrous sulfate and magnetite.

6. The process of claim 1 and further including the step of feeding said recovered magnetite-bearing product to a sulfur stripper for thermally removing residual sulfur from said magnetite.

7. The process of claim 1 wherein the product gas from the decomposition of the iron sulfates is treated while hot with sufficient oxygen to oxidize all of the reducing agents in the product gas and to generate a gas containing oxygen and sulfur dioxide suitable for sulfuric acid production.

8. The process of claim 7 wherein the gas containing sulfur dioxide and oxygen is used as a feed gas for the production of sulfuric acid.

9. The process of claim 1 wherein the product gas obtained from the decomposition of the iron sulfate in step (g) is:
   a. treated while hot to remove solid particulate material in the gas,
   b. reduced in part to convert part of the sulfur dioxide to elemental sulfur and hydrogen sulfide,
   c. cooled to condense the elemental sulfur in said gas,
   d. treated to extract the liquid elemental sulfur from the gas, and
   e. reheated and reacted in the presence of a catalyst to generate additional elemental sulfur.

10. The process of claim 1 wherein all of the iron oxide in the solid sorbent material of step (a) is generated from magnetite obtained from iron sulfates.

11. The process of claim 1 wherein the product gas of step (g) is in equilibrium composition with magnetite.

* * * * *